United States Patent
Lee

(10) Patent No.: US 9,619,053 B2
(45) Date of Patent: Apr. 11, 2017

(54) KNOB ASSEMBLY AND KNOB CONTROLLER FOR VEHICLE INCLUDING THE SAME

(71) Applicant: Hyundai Motor Company, Seoul (KR)

(72) Inventor: Jong Bok Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/809,228

(22) Filed: Jul. 26, 2015

(65) Prior Publication Data

US 2016/0154479 A1    Jun. 2, 2016

(30) Foreign Application Priority Data

Nov. 28, 2014   (KR) .................. 10-2014-0168278

(51) Int. Cl.
| | |
|---|---|
| G06F 3/0362 | (2013.01) |
| G06F 3/0488 | (2013.01) |
| G06F 3/0482 | (2013.01) |
| G06F 3/041 | (2006.01) |
| G06F 3/0354 | (2013.01) |

(52) U.S. Cl.
CPC ........ *G06F 3/0362* (2013.01); *G06F 3/03547* (2013.01); *G06F 3/041* (2013.01); *G06F 3/0482* (2013.01); *G06F 3/04883* (2013.01)

(58) Field of Classification Search
CPC .... G06F 3/0362; G06F 3/03547; G06F 3/041; G06F 3/0482; G06F 3/04883
See application file for complete search history.

(56) References Cited

U.S. PATENT DOCUMENTS

| | | | | |
|---|---|---|---|---|
| 2007/0057922 A1* | 3/2007 | Schultz | ............... | G06F 3/03547 345/173 |
| 2011/0121599 A1* | 5/2011 | Goupil, Jr. | ......... | B60H 1/00271 296/37.12 |
| 2011/0132905 A1* | 6/2011 | Ognjanovski | ...... | B60K 15/0406 220/86.2 |
| 2013/0241822 A1* | 9/2013 | Sharma | .................... | G06F 3/02 345/156 |

FOREIGN PATENT DOCUMENTS

| | | |
|---|---|---|
| JP | 2007-200732 A | 8/2007 |
| JP | 2012-053801 A | 3/2012 |
| JP | 2014-075219 A | 4/2014 |
| KR | 10-2011-0067246 | 6/2011 |
| KR | 10-2011-0101995 A | 9/2011 |

* cited by examiner

*Primary Examiner* — Liliana Cerullo
(74) *Attorney, Agent, or Firm* — Mintz Levin Cohn Ferris Glovsky and Popeo, P.C.; Peter F. Corless

(57) ABSTRACT

A knob simplified assembly and a knob controller for a vehicle including the knob assembly is provided. The knob assembly includes a cylindrical shaped body that has an aperture in a center thereof. A first touch panel is disposed at an exterior surface of the body and is configured to receive a touch input on the exterior surface. Additionally, a second touch panel is disposed at a side surface of the aperture and is configured to receive a touch input on the side surface.

15 Claims, 6 Drawing Sheets

KNOB ASSEMBLY AND KNOB CONTROLLER FOR VEHICLE INCLUDING THE SAME

CROSS-REFERENCE TO RELATED APPLICATION

This application claims priority to and the benefit of Korean Patent Application No. 10-2014-0168278 filed in the Korean Intellectual Property Office on Nov. 28, 2014, the entire contents of which are incorporated herein by reference.

BACKGROUND (a) Field of the Invention

The present invention relates to a simplified knob assembly and a knob controller for a vehicle including the knob assembly.

(b) Description of the Related Art

Generally, a vehicle is equipped with manipulation means for operating various electronic equipment such as an air conditioning device and an audio device. A knob is a rotational type of input device that can be manipulated by grasping and rotating the knob. The rotational knob may be difficult to be applied a system that has a complex menu structure. When using the rotational knob, a driver may be required to continually rotate the knob to select or perform a desired menu, thus causing driver distraction.

The above information disclosed in this section is merely for enhancement of understanding of the background of the invention and therefore it may contain information that does not form the prior art that is already known in this country to a person of ordinary skill in the art.

SUMMARY

The present invention provides a knob assembly having advantages of minimizing driver distraction by having a simplified structure and being more intuitive to operate, and a knob controller for a vehicle including the same.

An exemplary embodiment of the present invention provides a knob assembly that may include a cylindrical shaped body including an aperture in a center thereof, a first touch panel disposed at an exterior surface of the body and configured to receive a touch input on the exterior surface, and a second touch panel disposed at a side surface of the aperture and configured to receive a touch input on the side surface.

Another exemplary embodiment of the present invention provides a knob controller for a vehicle that may include a cylindrical shaped body including an aperture in a center thereof, a first touch panel disposed at an exterior surface of the body and configured to receive a touch input on the exterior surface, a second touch panel disposed at a side surface of the aperture and configured to receive a touch input on the side surface, and a controller configured to receive the touch input through the first touch panel or the second touch panel and perform a function corresponding to the touch input.

According to an exemplary embodiment of the present invention, touch panels that have distinguishable functions may be applied to an exterior surface and an interior surface of the knob, so a driver may operate the knob to perform a function of corresponding menu. Therefore, the driver may execute a menu with a simplified touch, thereby minimizing driver distraction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
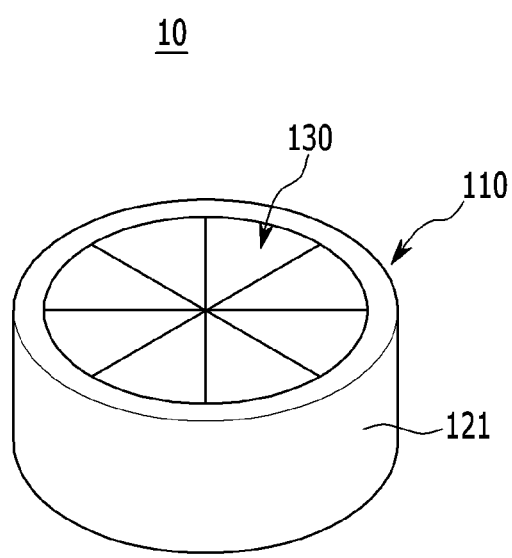
FIG. 1 is an exemplary view of a knob of which an aperture is shut according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

The drawings and description are to be regarded as illustrative in nature and not restrictive. Like reference numerals designate like elements throughout the specification. Throughout this specification and the claims that follow, when it is described that an element is "coupled" to another element, the element may be "directly coupled" to the other element or "electrically coupled" to the other element through a third element.

Figure 2:
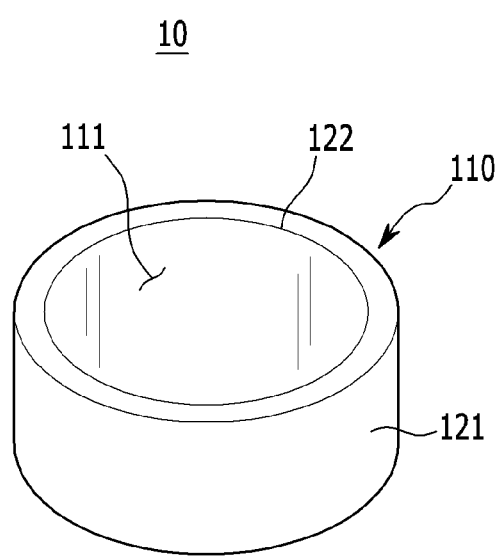
FIG. 2 is an exemplary view of a knob of which an aperture is open according to an exemplary embodiment of the present invention.
Figure 3:
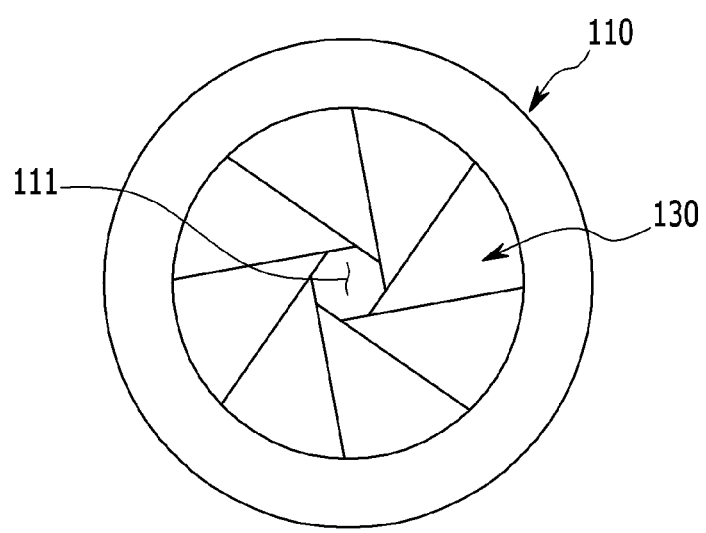
FIG. 3 is an exemplary upper view of a knob according to an exemplary embodiment of the present invention.
Figure 4:
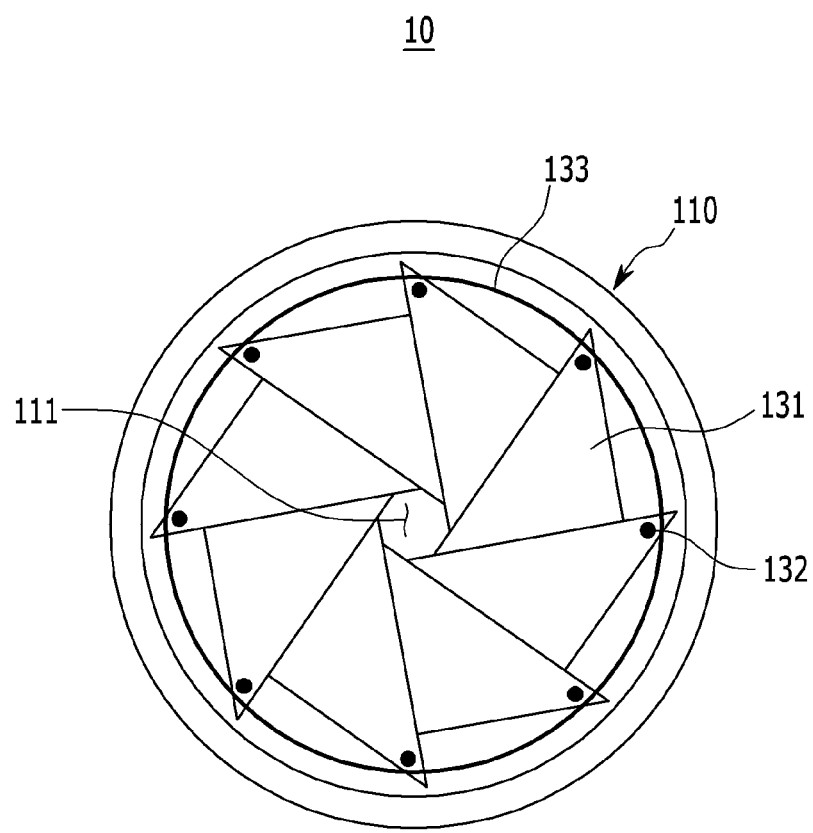
FIG. 4 is an exemplary cross-sectional view of a knob according to an exemplary embodiment of the present invention.

Hereinafter, a knob assembly and a knob controller for a vehicle including the same according to exemplary embodiments of the present invention will be described with reference to necessary drawings. FIG. 1 is an exemplary view of a knob of which an aperture is shut according to an exemplary embodiment of the present invention, and FIG. 2 is an exemplary view of a knob of which an aperture is open according to an exemplary embodiment of the present invention. In addition, FIG. 3 is an exemplary upper view of a knob according to an exemplary embodiment of the present invention, and FIG. 4 is an exemplary cross-sectional view of a knob according to an exemplary embodiment of the present invention.

Referring to FIG. 1 to FIG. 4, a knob 10 may include a body 110 having an aperture 111 in a center thereof, an exterior touch panel 121 disposed at an exterior surface of the body 110, and an interior touch panel 122 disposed at an interior surface of the body 110 which is a side surface of the aperture 111. In addition, the knob 10 may further include an open and shut structure 130 configured to open and close the aperture 111.

The body 110 may have a cylindrical shaped and may include the aperture 111 in the center thereof. Additionally, the body 110 may have the exterior touch panel 121 disposed on the exterior surface thereof and the interior touch panel 122 disposed on the interior surface thereof, to allow the body 110 to receive touch inputs on the exterior surface thereof and the interior surface thereof. For example, the exterior touch panel 121 may be disposed on the exterior surface of the body 110, and may be configured to detect a touch input on the exterior surface of the body 110. Additionally, the interior touch panel 122 may be disposed at the interior surface of the body 110 which is a side surface of the aperture 111, and may be configured to detect a touch input on the interior surface of the body 110.

As shown in FIG. 1, an exterior circumference of the body 110 where the exterior touch panel 121 is disposed and an interior circumference of the body 110 where the interior touch panel 122 is disposed may have a curved shape.

Therefore, the exterior circumference and the interior circumference of the body 110 may include a touch sensor having a flexible metal mesh structure. The aperture 111 may be formed with the body 110, and may be selectively opened and closed (e.g. shut). When opening the aperture 111, foreign particles may be inserted into (e.g., may flow into) the aperture 111 causing a potential malfunction of the interior touch panel 122. Therefore, as shown in FIG. 3, an open and shut structure 130 configured to open and close the aperture 111 may be disposed at the aperture 111.

The open and shut structure 130 may be configured to automatically open and close the aperture 111. Accordingly, the interior touch panel 122 may be exposed to the exterior or covered by the open and shut structure 130. In particular, the knob 10 may further include a driving motor (not shown) configured to open and close the open and shut structure 130 based on an input control signal. The open and shut structure 130 may be automatically opened and shut based on a touch input on the exterior touch panel 121, a vehicle speed, and a currently selected menu. Hereinafter, driving of the open and shut structure 130 according to an exemplary embodiment of the present invention will be described in detail with reference to FIG. 4.

Referring to FIG. 4, the open and shut structure 130 may include a plurality of shutter blades 131, a plurality of fixing members 132, and a rotational orbit member 133. The plurality of shutter blades 131 may be rotatably coupled to the aperture 111 of the body 110, and may be disposed to be engaged with each other. The plurality of shutter blades 131 may rotate by interlocking with a rotation operation of the rotational orbit member 133 to cause the plurality of shutter blades 131 to open and close the aperture 111 based on a rotating direction.

In the FIG. 4, the shutter blade 131 is shown as a triangle shape, but this is merely an exemplary embodiment of the present invention, and the shutter blade 131 may be modified in other shapes and forms. The plurality of fixing members 132 may be configured to rotatably fix each shutter blade 131 to the body 110, and operate as rotation axes of each shutter blade 131. In other words, the shutter blades 131 may be configured to rotate around the fixing member 132s. The rotational orbit member 133 may be rotated by a driving torque transmitted from the driving motor. The rotational orbit member 133 may have a ring shape, and may be configured to rotate on the aperture 111 in a clockwise or anticlockwise direction. Each shutter blade 131 may be sequentially coupled to the ring shaped rotational orbit member 133 along a circumference of the rotational orbit member 133. Accordingly, the plurality of shutter blades 131 may be configured to rotate on the fixing member 132 by interlocking with a rotation operation of the rotational orbit member 133.

According to an exemplary embodiment of the present invention as described above, the knob 10 may include touch panels at an interior surface as well as an exterior surface, and may correspond to distinguishable functions to the exterior touch panel 121 and the interior touch panel 122. Thus, the knob 10 may be configured to receive various driver inputs using a simplified operation. The knob 10 may be included in a knob controller for a vehicle such as a driver information system (DIS) in a center fascia and used as manipulation device.

Figure 5:
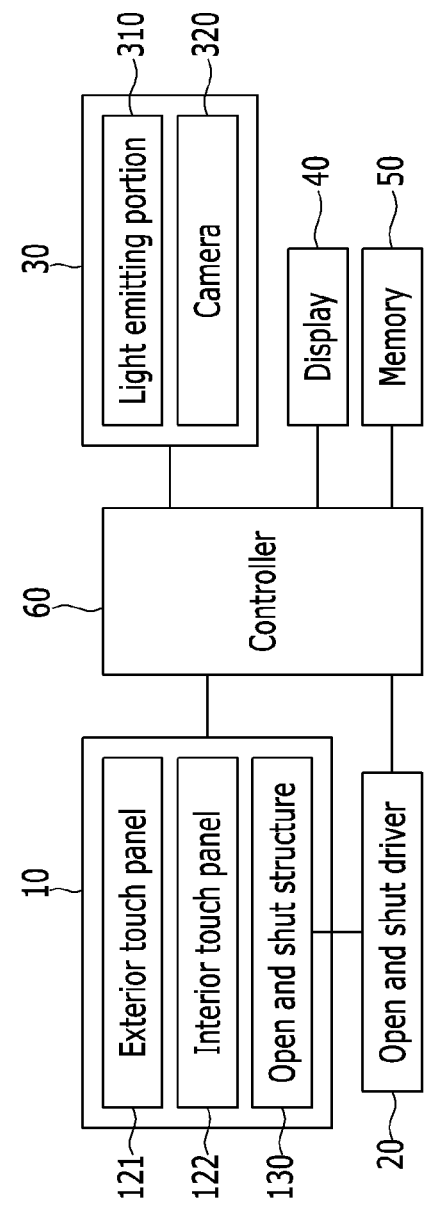
FIG. 5 is an exemplary schematic block diagram showing a knob controller for a vehicle according to an exemplary embodiment of the present invention.

Hereinafter, a knob controller for a vehicle according to an exemplary embodiment of the present invention will be described in detail with reference to FIG. 5 and FIG. 6. FIG. 5 is an exemplary schematic block diagram showing a knob controller for a vehicle according to an exemplary embodiment of the present invention. In addition, FIG. 6 is an exemplary drawing illustrating a method of receiving a touch input through a display in a knob controller for a vehicle according to an exemplary embodiment of the present invention.

Referring to FIG. 5, a knob controller for a vehicle according to an exemplary embodiment of the present invention may include a knob 10, an open and shut driver 20, a touch gesture detector 30, a display 40, a memory 50, and a controller 60. The knob 10 may include an exterior touch panel 121, an interior touch panel 122, and an open and shut structure 130. The controller 60 may be configured to operate the open and shut driver 20, the touch gesture detector 30, the display 40, and the memory 50. In addition, the touch gesture detector 30 may be a sensor.

The exterior touch panel 121 may be coupled to an exterior surface of the body 110, and may be configured to receive a touch input on the exterior surface of the body 110. For example, the exterior touch panel 121 may be configured to receive a touch gesture of dragging on the exterior surface of the body 110 (e.g., a pressure is maintained while be moved along the panel) and a touch gesture of tapping on the exterior surface of the body 110. The interior touch panel 122 may be coupled to an interior surface of the body 110, and may be configured to receive a touch input on the interior surface of the body 110. For example, the interior touch panel 122 may be configured to receive a touch gesture of dragging on the interior surface of the body 110 and a touch gesture of tapping on the interior surface of the body 110. The open and shut structure 130 may be configured to expose the interior touch panel 122 or block the interior touch panel 122 by selectively opening and closing (e.g., shutting) the aperture 111 of the body 110.

Figure 6:
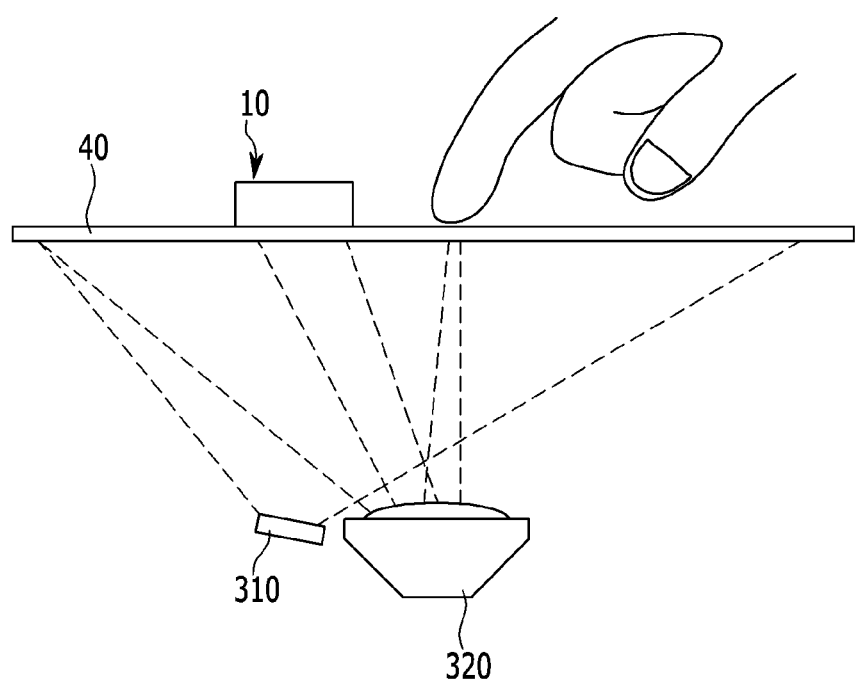
FIG. 6 is an exemplary drawing illustrating a method of receiving a touch input through a display in a knob controller for a vehicle according to an exemplary embodiment of the present invention.

The knob 10 may be mounted on the display 40 of the knob controller for a vehicle as shown in FIG. 6. The open and shut driver 20 may include a driving motor (not shown) configured to rotate the open and shut structure 130 to cause the open and shut driver 20 to rotate the open and shut structure 130 in a clockwise or anticlockwise direction based on a control signal from the controller 60. Meanwhile, the open and shut driver 20 and the knob 10 may be provided separately in the exemplary embodiment of the present invention as shown in FIG. 5, but they are not limited thereto. In another exemplary embodiment of the present invention, the open and shut driver 20 may be formed integrally at the knob 10. The open and shut structure 130 may be configured to prevent malfunction of the interior touch panel 122 caused by inflow of foreign particles by closing the aperture 111.

The touch gesture detector 30 may include a light emitting portion 310 and an imaging device 320 (e.g., camera, video camera, or the like). As shown in FIG. 6, the light emitting portion 310 may be configured to radiate light to a rear surface of the display 40, and the imaging device 320 may be configured to acquire an image of light radiated from the light emitting portion 310 and reflected from the rear surface of the display 40. The image photographed or captured by the imaging device 320 may be transmitted to the controller 60, and the controller 60 may be configured to detect a touch gesture (e.g., applied pressure) regarding the display 40 by analyzing the image.

In an exemplary embodiment of the present invention, FIG. 6 illustrates that the light emitting portion 310 and the imaging device 320 are disposed at a rear lower surface of the display 40, but the present invention is not limited thereto. According to an another exemplary embodiment of the present invention, the light emitting portion 310 and the imaging device 320 may be disposed at a lower end of the knob 10 or disposed at a bottom of the aperture 111. In particular, the light emitting portion 310 may be configured to radiate light to the lower end of the knob 10 or to an opening of the aperture 111, and the imaging device 320 may be configured to capture an image of reflective light.

Further, the display 40 may be configured to output (e.g., display) information processed by the knob controller on a screen. The memory 50 may be configured to store a program for operation of the controller 60 and various data processed by the controller 60. Additionally, the memory 50 may be configured to store data regarding a user interface (UI) output on the display 40. For example, the memory 50 may be configured to store graphics data and a menu structure to display the UI. The memory 50 may be configured to build or generate a database and store functions that correspond to touch inputs input by the knob 10 by forming the database.

Herein, the memory 50 may correspond to a distinguishable function or menu between the touch input through the exterior touch panel 121 and the touch input through the interior touch panel 122. For example, the touch input of the exterior touch panel 121 may correspond to a higher menu such as an audio device, an air conditioning device, and a navigation device, and the touch input of the interior touch panel 122 may correspond to a lower menu such as a volume control and a temperature control. In addition, the memory 50 may be configured to build a database and store functions that correspond to touch gestures detected by the touch gesture detector 30 in the database. The controller 60 may be configured to operate the knob controller for the vehicle.

The controller 60 may be configured to receive the touch input through the knob 10, and perform a corresponding function. When the controller 60 receives the touch input through the knob 10, the controller 60 may be configured to determine through which touch panel the touch is input through between the exterior touch panel 121 and the interior touch panel 122, and perform a function that corresponds to the touch panel. The controller 60 may also be configured to select a specific higher menu based on the touch input when the touch input of the exterior touch panel 121 is input through the knob 10. In other words, the controller 60 may be configured to select the specific higher menu by adjusting a rotation direction and a rotation amount when the touch input of the exterior touch panel 121 is input through the knob 10.

Furthermore, the controller 60 may be configured to adjust a moving speed between the menu based on a touch speed even when the rotation amount of the touch input is the same (e.g., the amount of pressure applied is about that same). In addition, the controller 60 may be configured to select a specific lower menu based on the touch input when the touch input of the interior touch panel 122 is input through the knob 10. In other words, the controller 60 may be configured to adjust moving between lower menus (e.g., sub menus) included in a currently selected higher menu (e.g., main menus) based on a rotation direction and a rotation amount when the touch input of the interior touch panel 122 is input through the knob 10. For example, when the currently selected higher menu is music, the controller 60 may be configured to select a lower menu or a sub menu of the music function such as a search and a volume control based on the touch input of the interior touch panel 122.

In addition, the controller 60 may be configured to perform a function that corresponds to the lower menu based on a touch position when a tapping touch input is input through the interior touch panel 122. The controller 60 may further be configured to operate the open and shut driver 20 to expose the interior touch panel 122 or block the interior touch panel 122 of the knob 10. When the touch input on the exterior touch panel 121 of the knob 10 is input, the controller 60 may be configured to determine an intention to operate a menu and operate the open and shut driver 20 to expose the interior touch panel 122. In particular, when the touch input on the exterior touch panel 121 of the knob 10 is not input more than a predetermined number of times (e.g., is input less than a predetermined number of times), the controller 60 may be configured to operate the open and shut driver 20 to block the interior touch panel 122. For example, the controller 60 may be configured to operate the open and shut driver 20 to expose the interior touch panel 122 when a vehicle speed is greater than or equal to a predetermined speed.

Additionally, the controller 60 may be configured to operate the open and shut driver 20 to open or close the aperture 111 of the knob 10 based on a currently displayed menu. In particular, when the currently displayed menu is determined to require a particular lower menu, the controller 60 may be configured to operate the open and shut driver 20 to open the aperture 111 of the knob 10 and expose the interior touch panel 122. When the currently displayed menu is determined to not require a particular lower menu, the controller 60 may be configured to operate the open and shut driver 20 to close the aperture 111 of the knob 10 and block the interior touch panel 122. The controller 60 may further be configured to detect a touch gesture at the display 40 using the touch gesture detector 30, and perform a function that corresponds to the touch gesture. In particular, the controller 60 may be configured to detect the touch gesture by analyzing the image photographed by the imaging device 320.

As described above, according to an exemplary embodiment of the present invention, touch panels that have distinguishable functions may be applied to an exterior surface and an interior surface of the knob, to allow a driver to operate the knob to perform a corresponding menu function. Therefore, the driver may execute a menu with a touch, thereby minimizing driver distraction.

The foregoing drawings and detailed description of the invention are merely illustrative of the present invention and are used for describing the present invention, but are not used to limit meaning or for limiting the scope of the present invention described in the claims. Therefore, a person of ordinary skill in the art can easily select and replace from the foregoing drawings and the detailed description. Further, a person of ordinary skill in the art may omit some of constituent elements described in this specification without degradation of performance, or may add constituent elements in order to enhance performance. A person of ordinary skill in the art may also change order of method steps that are described in this specification according to a process environment or equipment. Therefore, the scope of the present invention should be determined by the appended claims and their equivalents, rather than described implementations.

DESCRIPTION OF SYMBOLS

10: knob
110: body
111: aperture
121: exterior touch panel
122: interior touch panel
130: open and shut structure
20: open and shut driver
30: touch gesture detector
310: light emitting portion
320: imaging device
40: display
50: memory
60: controller While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A knob assembly, comprising:
    a cylindrical shaped body that includes an aperture in a center thereof;
    a first touch panel disposed at an exterior surface of the body; and
    a second touch panel disposed at a side surface of the aperture; and
    an open and shut structure configured to expose the second touch panel or block the second touch panel by selectively opening and closing the aperture of the body.

2. The knob assembly of claim 1, wherein the open and shut structure includes:
    a ring shaped rotational orbit member configured to rotate on a center of the aperture;
    a plurality of shutter blades sequentially coupled along a circumference of the rotational orbit member, rotate by interlocking with a rotation operation of the rotational orbit member, and are configured to open and close the aperture; and
    a plurality of fixing members that rotatably fix the plurality of shutter blades to the body, and operate as a rotation axis of each shutter blade.

3. The knob assembly of claim 2, further comprising:
    a driving motor configured to rotate the rotational orbit member based on a received control signal.

4. A knob controller for a vehicle, comprising:
    a cylindrical shaped body that includes an aperture in a center thereof;
    a first touch panel disposed at an exterior surface of the body;
    a second touch panel disposed at a side surface of the aperture;
    an open and shut structure configured to expose the second touch panel or block the second touch panel by selectively opening and closing the aperture of the body; and
    a controller operably connected to the first touch panel and the second touch panel and configured to provide a control signal to operate the open and shut structure.

5. The knob controller of claim 4, further comprising:
    a display;
    a light emitting portion configured to radiate light to a rear surface of the display; and
    an imaging device configured to capture an image of reflective light radiated from the light emitting portion,
    wherein the controller is configured to detect a touch gesture at the display by analyzing the captured image.

6. The knob controller of claim 4, further comprising:
a light emitting portion disposed at a lower end of the knob and configured to radiate light to a lower surface of the knob; and
an imaging device disposed at the lower end of the knob and configured to capture an image of reflective light radiated from the light emitting portion,
wherein the controller is configured to detect a touch gesture at the knob by analyzing the captured image.

7. The knob controller of claim 4, further comprising:
a light emitting portion disposed at a bottom of the aperture and configured to radiate light; and
an imaging device disposed at the bottom of the aperture and configured to capture an image of reflective light radiated from the light emitting portion,
wherein the controller is configured to detect a touch gesture at the knob by analyzing the captured image.

8. The knob controller of claim 4, wherein the open and shut structure includes:
a ring shaped rotational orbit member configured to rotate on a center of the aperture;
a plurality of shutter blades sequentially coupled along a circumference of the rotational orbit member, rotate by interlocking with a rotation operation of the rotational orbit member, and configured to open and close the aperture; and
a plurality of fixing members that rotatably fix the plurality of shutter blades to the body, and operate as a rotation axis of each shutter blade.

9. The knob controller of claim 8, further comprising:
an open and shut driver having a driving motor configured to rotate the rotational orbit member.

10. The knob controller of claim 9, wherein the controller is configured to operate the open and shut driver to open the aperture when a touch input is input through the first touch panel.

11. The knob controller of claim 9, wherein the controller is configured to operate the open and shut driver to open and close the aperture based on a vehicle speed.

12. The knob controller of claim 9, further comprising:
a display configured to output a menu screen,
wherein the controller is configured to operate the open and shut driver to open and close the aperture based on a currently displayed menu screen.

13. The knob controller of claim 12, wherein the controller is configured to select a higher menu in a hierarchical menu structure based on the touch input input through the first touch panel.

14. The knob controller of claim 13, wherein the controller is configured to select any one of the higher menu of an audio device, an air conditioning device, and a navigation device based on the touch input through the first touch panel.

15. The knob controller of claim 12, wherein the controller is configured to select a lower menu included in a currently selected higher menu based on the touch input through the second touch panel.

* * * * *